(12) United States Patent
Yang

(10) Patent No.: US 12,513,392 B2
(45) Date of Patent: Dec. 30, 2025

(54) DAY-NIGHT SWITCHING METHOD, ELECTRONIC DEVICE, AND STORAGE MEDIUM

(71) Applicant: XI'AN UNIVIEW INFORMATION TECHNOLOGIES CO., LTD, Xi'an (CN)

(72) Inventor: Yingqing Yang, Hangzhou (CN)

(73) Assignee: XI'AN UNIVIEW INFORMATION TECHNOLOGIES CO., LTD, Xi'an (CN)

(*) Notice: Subject to any disclaimer, the term of this patent is extended or adjusted under 35 U.S.C. 154(b) by 206 days.

(21) Appl. No.: 18/293,893

(22) PCT Filed: Jul. 20, 2022

(86) PCT No.: PCT/CN2022/106849
§ 371 (c)(1),
(2) Date: Jan. 31, 2024

(87) PCT Pub. No.: WO2023/011191
PCT Pub. Date: Feb. 9, 2023

(65) Prior Publication Data
US 2024/0334049 A1 Oct. 3, 2024

(30) Foreign Application Priority Data
Aug. 4, 2021 (CN) .................. 202110892573.X

(51) Int. Cl.
H04N 23/667 (2023.01)
H04N 23/71 (2023.01)
H04N 23/74 (2023.01)
(52) U.S. Cl.
CPC ........... H04N 23/667 (2023.01); H04N 23/71 (2023.01); H04N 23/74 (2023.01)

(58) Field of Classification Search
CPC ...... H04N 23/667; H04N 23/71; H04N 23/74; Y02B 20/40
See application file for complete search history.

(56) References Cited

U.S. PATENT DOCUMENTS 10,586,351 B1* 3/2020 Brailovskiy ........... H04N 23/75
2006/0244583 A1* 11/2006 Kawada ............... H04N 23/635
348/E5.04
(Continued)

FOREIGN PATENT DOCUMENTS

| CN | 104301616 A | 1/2015 |
| CN | 110225257 A | 9/2019 |

(Continued)

OTHER PUBLICATIONS

International Search Report in Application No. PCT/2022/106849, dated Sep. 23, 2022, 4 pages, including translation.
(Continued)

Primary Examiner — Lin Ye
Assistant Examiner — Tuan H Le
(74) Attorney, Agent, or Firm — MASCHOFF BRENNAN

(57) ABSTRACT

A day-night switching method includes determining image illumination according to a photographed image acquired by a camera device; in the case where the image illumination is greater than the current black-to-color switching threshold, determining an image illumination influence factor according to the photographed image; in the case where the image illumination influence factor is environmental illumination, controlling the camera device to perform day-night switching according to the image illumination and the current black-to-color switching threshold; in the case where the image illumination influence factor is a fill light, determining a new black-to-color switching threshold according to the photographing parameter of the camera device and the
(Continued)

photographed image; and controlling the camera device to perform day-night switching according to the image illumination and the new black-to-color switching threshold.

20 Claims, 4 Drawing Sheets

(56) References Cited

U.S. PATENT DOCUMENTS

| | | | |
|---|---|---|---|
| 2013/0194469 | A1 | 8/2013 | Nakata et al. |
| 2016/0127659 | A1 | 5/2016 | Kawasaki |
| 2016/0330386 | A1 | 11/2016 | Sasao et al. |
| 2016/0366337 | A1 | 12/2016 | Duran et al. |
| 2019/0364187 | A1* | 11/2019 | Kawasaki .............. H04N 23/11 |
| 2020/0126378 | A1* | 4/2020 | Van Cleave .......... H04N 23/56 |
| 2021/0084209 | A1 | 3/2021 | Kawasaki |
| 2021/0195108 | A1* | 6/2021 | Wang ..................... H04N 23/73 |
| 2021/0306546 | A1* | 9/2021 | Jönsson ............... H04N 23/667 |
| 2022/0182525 | A1* | 6/2022 | Lv ............................. G06T 7/90 |

FOREIGN PATENT DOCUMENTS

| | | |
|---|---|---|
| CN | 110536051 A | 12/2019 |
| CN | 111669510 A | 9/2020 |
| CN | 111726514 A | 9/2020 |
| CN | 112672042 A | 4/2021 |

OTHER PUBLICATIONS

First Office Action in Chinese Application No. 202110892573.X dated Nov. 22, 2023, 9 pages, including translation.
Extended European Search Report for Application No. 22851905.4, dated Jun. 23, 2025, 12 pages.

* cited by examiner

DAY-NIGHT SWITCHING METHOD, ELECTRONIC DEVICE, AND STORAGE MEDIUM

CROSS REFERENCE TO RELATED APPLICATIONS

This is a National Stage Application, filed under 35 U.S.C. 371 based on International Patent Application No. PCT/CN2022/106849, filed on Jul. 20, 2022, which claims priority to Chinese Patent Application No. 202110892573.X filed on Aug. 4, 2021, the disclosures of which are incorporated herein by reference in their entireties.

TECHNICAL FIELD

The present disclosure relates to the field of camera device control, for example, a day-night switching method for a camera device, an electronic device, and a storage medium.

BACKGROUND

With the continuous development of digital camera technology, there are more and more types of camera devices, and the challenge to the camera devices is also increasing. Day-night switching control is an essential function for a front-end camera device. For infrared products, day-night switching means that a camera determines whether an image is in a color mode or a black and white mode according to image illumination. For white/warm light products, day-night switching needs to determine whether a fill light is turned on or turned off. A day-night switching strategy has become a focus of research. In related art, the day-night switching strategy calibrates a day-night switching threshold according to a fixed environment. This strategy may encounter the problem of repeatedly switching between day mode and night mode in small scenarios. For this problem, the most common solution is to determine whether to switch between the day mode and night mode according to an infrared ratio or add a peripheral photosensor to assist in day-night switching. The day-night switching strategy can no longer satisfy various types of camera devices and has certain limitations.

SUMMARY

The present disclosure provides a day-night switching method, an electronic device, and a storage medium applied to a camera device.

The present disclosure provides a day-night switching method. The method includes the steps below.

Image illumination is determined according to a photographed image acquired by the camera device.

In response to the image illumination being greater than the current black-to-color switching threshold, an image illumination influence factor is determined according to the photographed image.

In response to the image illumination influence factor being environmental illumination, the camera device is controlled to perform day-night switching according to the image illumination and the current black-to-color switching threshold.

In response to the image illumination influence factor being a fill light, a new black-to-color switching threshold is determined according to the photographing parameter of the camera device and the photographed image. The camera device is controlled to perform day-night switching according to the image illumination and the new black-to-color switching threshold.

The present disclosure also provides an electronic device. The electronic device includes one or more processors and a storage apparatus configured to store one or more programs.

When executing the one or more programs, the one or more processors perform the preceding day-night switching method.

The present disclosure also provides a computer-readable storage medium. The storage medium stores a computer program. When executing the computer program, a processor performs the preceding day-night switching method.

DETAILED DESCRIPTION

Figure 1:
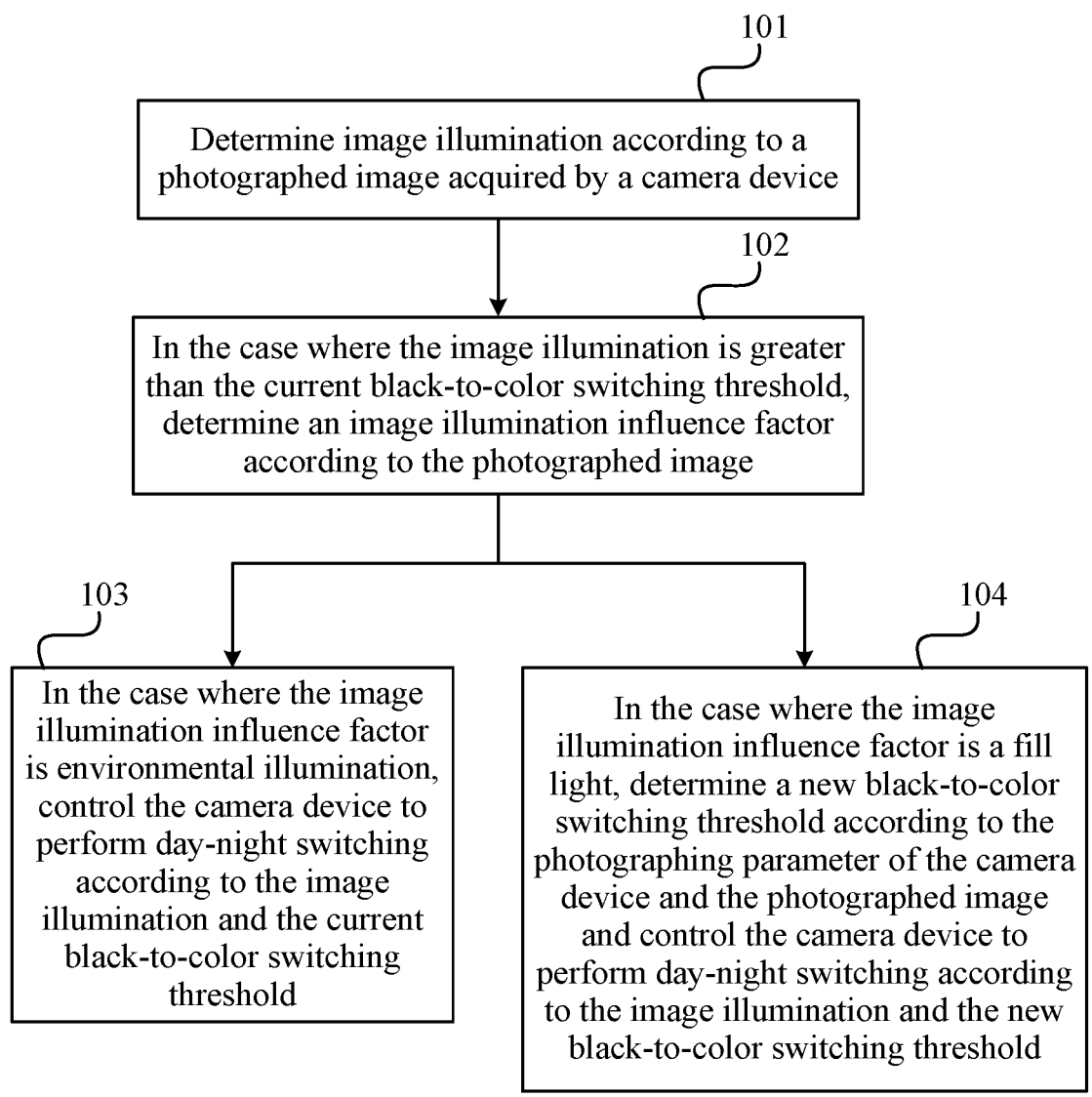
FIG. 1 is a flowchart of a day-night switching method according to an embodiment of the present disclosure.

Technical solutions in embodiments of the present disclosure are described in conjunction with drawings in the embodiments of the present disclosure. The described embodiments are only part of the embodiments of the present disclosure.

All directional indications in the embodiments of the present disclosure (such as up, down, left, right, front, back . . . ) are used only to explain the relative positional relationship and motion between multiple components in a particular posture (as shown in the drawings). If the particular posture changes, the directional indication accordingly changes.

In addition, terms like "first" and "second", if used herein, are for description only and are not to be construed as indicating or implying relative importance or implicitly indicating the number of technical features as indicated. Thus, a feature defined as a "first" feature or a "second" feature may expressly or implicitly include at least one of this feature. As described herein, "multiple" is defined as at least two, for example, two, three or the like, unless otherwise expressly limited.

In the present disclosure, unless otherwise specified and limited, the term "connected" or "fixed" is to be construed in a broad sense. For example, "fixed" may be construed as permanently connected, detachably connected, or integrated; mechanically connected or electrically connected; directly connected, or indirectly connected via an intermediary; or intraconnected or interactional between two components, unless otherwise limited. For those of ordinary skill in the art, meanings of the preceding terms can be understood according to situations in the present disclosure.

In addition, technical solutions in various embodiments of the present disclosure may be combined with each other on the premise that the combined solutions can be practiced by those skilled in the art.

With the continuous development of digital camera technology, there are more and more types of camera devices. Day-night switching is an essential function for a front-end camera device. Whether it is for infrared products or white light/warm light products, a day-night switching strategy that calibrates a day-night switching threshold according to a fixed environment may easily encounter the problem of repeatedly switching day and night states in small scenarios or some specific scenarios. To overcome this defect, embodiments of the present disclosure propose a solution to dynamically determine/adjust a black-to-color switching threshold, and further to control the device to perform day-night switching based on the determined black-to-color switching threshold, thereby reducing the increase in the system complexity caused by the introduction of other peripheral photoreceptors at the same time, and avoiding the increase in costs.

Before the related embodiments, several aspects involved in the embodiments of the present disclosure are introduced.

A light distribution curve refers to the light intensity distribution of a light source in multiple directions in space. The curve formed by marking light emission intensity values in multiple directions on a polar coordinate diagram is the light distribution curve of a lamp.

The exposure equation of an additive system of photographic exposure (APEX) is an experience formula proposed by the American National Standards Institute (ANSI) to facilitate the calculation of the exposure parameter of a film camera.

Chroma, also known as a hue, is the color perception generated when human eyes see one or more wavelengths. The chroma reflects the type of color and determines the basic characteristics of the color. A tone is the attribute of the color. The tone varies continuously and describes the true color.

Brightness also known as intensity or lightness, which refers to the human eye's perception of changes in brightness and darkness on the surface of an object.

RGB color space is the most common color space. Based on three primary colors of red, green, and blue, the three primary colors are superimposed to varying degrees to produce rich and extensive colors. There is a strong correlation between three colors of RGB, and RGB color space is not uniform color space.

YUV color space is a color coding method used by the European television system. The YUV color space is mainly used to optimize the transmission of color video information. Compared with RGB video signal transmission, only very little bandwidth needs to be occupied. Y denotes brightness, that is, a grayscale value. UV denotes chroma. The conversion between YUV and RGB is linear conversion.

A sensor is a common and important sensing device. The sensor is a device and apparatus that senses a variety of specified and measured quantities and converts them into useful signals according to certain rules. Unless otherwise specified, in the embodiments of the present disclosure, the sensor described refers to the sensing device in the camera device.

A gain generally refers to the magnification of the current or power of a component, circuit, device, or system and is specified in decibels (dB) and is a relative value. Unless otherwise specified, in the embodiments of the present disclosure, the device gain described refers to a gain of a photographing device (camera).

The present disclosure provides a day-night switching method. As shown in FIG. 1, the method includes the steps below.

In step 101, image illumination is determined according to a photographed image acquired by a camera device.

In step 102, in the case where the image illumination is greater than the current black-to-color switching threshold, an image illumination influence factor is determined according to the photographed image.

In step 103, in the case where the image illumination influence factor is environmental illumination, the camera device is controlled to perform day-night switching according to the image illumination and the current black-to-color switching threshold.

In step 104, in the case where the image illumination influence factor is a fill light, a new black-to-color switching threshold is determined according to the photographing parameter of the camera device and the photographed image. The camera device is controlled to perform day-night switching according to the image illumination and the new black-to-color switching threshold.

In the embodiments of the present disclosure, different black-to-color switching thresholds are determined according to different image illumination influence factors, and day-night switching control is performed accordingly. In this manner, a black-to-color switching threshold can be optimized according to software strategies instead of relying on auxiliary peripherals, thereby effectively reducing repeated switching between day mode and night mode and achieving higher cost effectiveness.

In the embodiments of the present disclosure, black-to-color switching or color-to-black switching is a paradigmatic description. When the fill light is a white light or a warm light, it means turning the fill light on or turning the fill light off, that is, filling light or not filling light in a color mode.

In the embodiments of the present disclosure, the image illumination influence factor is determined based on a related attenuation factor, and a black-to-color switching threshold is dynamically determined. The control of the camera device to perform day-night switching described in step 103 and step 104 refers to the switching control of the camera device (camera) from a night mode to a day mode related to the black-to-color switching threshold. The switching control and the switching control of the camera device from the day mode to the night mode are collectively referred to as day-night switching.

Figure 2:
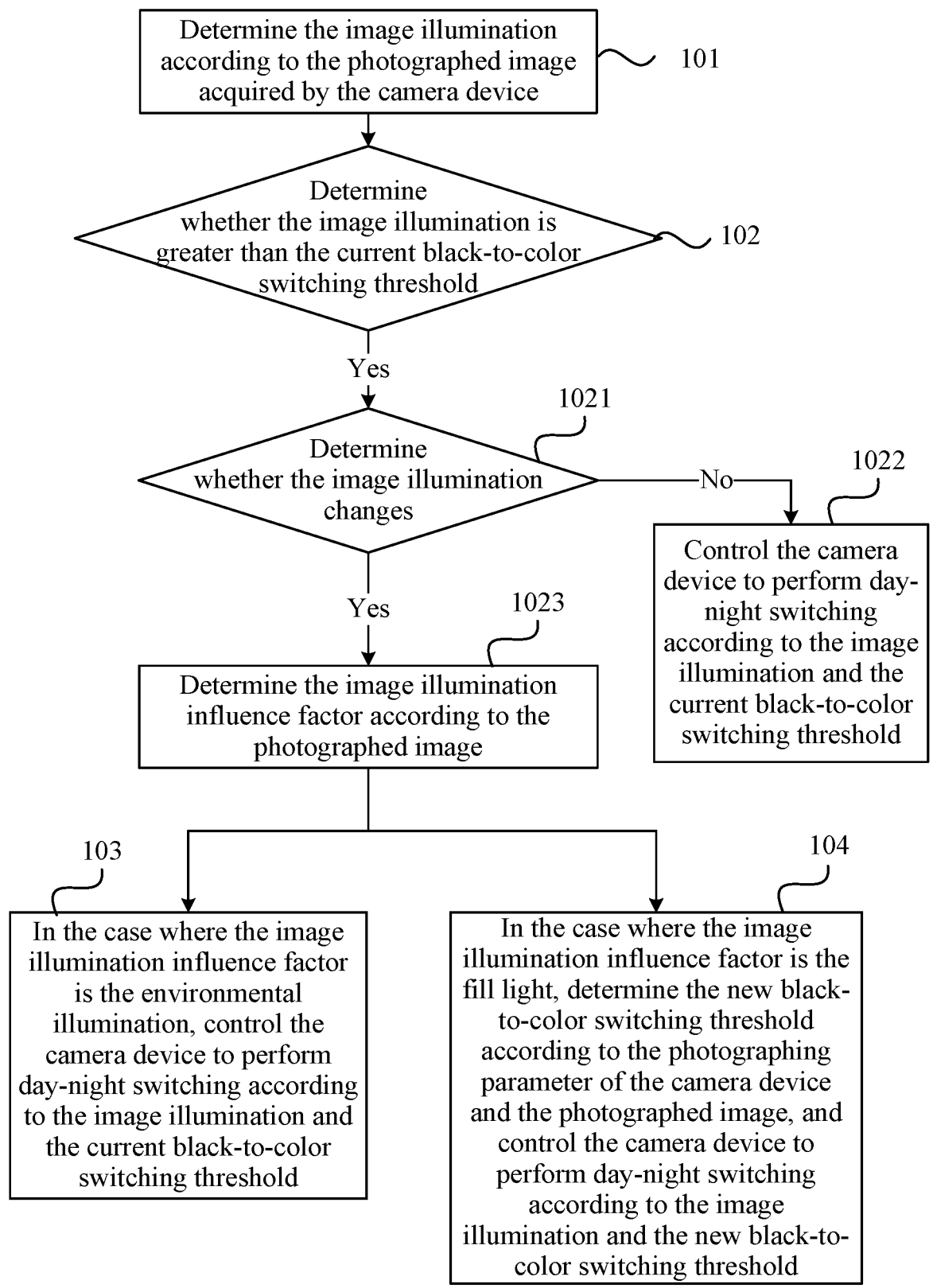
FIG. 2 is a flowchart of another day-night switching method according to an embodiment of the present disclosure.

In some embodiments, as shown in FIG. 2, before the image illumination influence factor is determined according to the photographed image, the method also includes the step 1021.

In step 1021, whether the image illumination changes is determined. In the case where the image illumination is not changed, the step 1022 is performed, and the camera device is controlled to perform day-night switching according to the image illumination and the current black-to-color switching threshold. In the case where the image illumination changes, the step 1023 is performed. The image illumination influence factor is determined according to the photographed image.

In some example embodiments, whether the image illumination changes is determined in the manners below.

The change amplitude of the current image illumination compared with the historical image illumination acquired last time is calculated. When the change amplitude is less than a first change amplitude threshold, it is determined that the image illumination does not change. When the change amplitude is greater than or equal to the first change amplitude threshold, it is determined that the image illumination changes. Alternatively, the change amplitude of the current image illumination compared with the average value of the historical image illumination acquired for previous N times is calculated. When the change amplitude is less than a second change amplitude threshold, it is determined that the image illumination does not change. When the change amplitude is greater than or equal to the second change amplitude threshold, it is determined that the image illumination changes.

For example, the first change amplitude threshold is 2%. When the change amplitude of the current illumination compared with the historical image illumination acquired last time is within plus or minus 2%, it is determined that the image illumination does not change. When the change amplitude of the current illumination compared with the historical image illumination acquired last time is not within plus or minus 2%, it is determined that the image illumination changes. For another example, when the first change amplitude threshold is small enough and approaches 0, if the change amplitude of image illumination is less than the first change amplitude, it indicates that the current image illumination is basically unchanged and does not change. The preceding first change amplitude threshold or the preceding second change amplitude threshold is set according to application requirements and is not limited to the content exemplified in the present disclosure.

In this embodiment, the fact that the image illumination does not change indicates that it is not necessary to determine the image illumination influence factor according to the current environment of the camera device and the working state of the device, and it is not necessary to dynamically determine a new black-to-color switching threshold. It is only necessary to control the camera device to perform day-night switching according to the existing black-to-color switching threshold. The change amplitude value of the image illumination is greater than or equal to the change amplitude threshold (the first change amplitude threshold or the second change amplitude threshold), which indicates that the current environment of the camera device and the working state of the device cause the quality of the photographed image to decline, and a new black-to-color switching threshold needs to be dynamically determined. In the case where the image illumination does not change, the calculated black-to-color switching threshold continues to be used to perform subsequent day-night switching control, which can reduce performance waste without more complex determination and calculation.

In some example embodiments, the initial value of a black-to-color switching threshold is predetermined according to the manners below.

In a dark room scenario, the camera device is configured to be in a night mode, and the fill light is turned on, environment brightness is gradually increased. In the case where the image quality of an image acquired by the camera device satisfies a preset image quality requirement after removing a fill light factor, the current environmental illumination value is acquired and used as the initial value of the black-to-color switching threshold.

The acquisition of an initial day-night threshold is strongly correlated with the photosensitivity of a sensor and the photosensitivity of a lens. Thus, different sensors and lenses need to recalibrate the initial day-night threshold, which is also referred to as a basic day-night threshold.

In some example embodiments, the initial day-night threshold is obtained in the manners below.

Step 1. In a large dark room scenario, the camera device is forced to be in a color mode (day mode) to reduce environment brightness. When the image quality does not satisfy a requirement, an environment brightness value is read, and the environment brightness value read at this time is set as a color-to-black switching threshold $T_{d2n}$.

Step 2. The camera device is forced to be in a night mode, the fill light is turned on, and the environment brightness is gradually increased. When the image quality of the acquired image satisfies the preset image quality requirement after removing the fill light factor (the fill light remains on), the environmental illumination value and the gain value of the current camera device at this time are read and set as a black-to-color switching threshold $T_{n2d}$ and a black-to-color switching gain $Gain_{loseless}$.

Illustratively, black-to-color switching or color-to-black switching is a paradigmatic description. When the fill light is a white light or a warm light, it means turning the fill light on or turning the fill light off.

The environmental illumination is calculated by a gain, a shutter, and an aperture. The calculation method of an environmental illumination value may be expanded according to requirements.

In some example embodiments, the APEX exposure equation is used for acquisition. The formula is as follows:

$$A_v + T_v = S_v + B_v \qquad (1)$$

$A_v$ denotes an aperture size. $T_v$ denotes a shutter speed. $S_v$ denotes camera sensitivity. $B_v$ denotes the average illumination of environment light.

The initial value of the black-to-color switching threshold of the camera device may be determined according to the preceding step 2. Those skilled in the art may also use other methods to determine the initial value of the black-to-color switching threshold of the camera device, which is not limited to the specific method of the disclosed example.

In some example embodiments, in step 102, the image illumination influence factor is determined according to the photographed image in the manners below.

A first attenuation factor that indicates the uniformity of brightness of the central region in the photographed image and brightness of the edge region in the photographed image is determined according to the photographed image. A second attenuation factor that indicates the uniformity of brightness of the center point in the photographed image and brightness of four corner positions in the photographed image is determined according to the photographed image. The image illumination influence factor is determined according to the first attenuation factor and the second attenuation factor.

In some example embodiments, in step 102, the image illumination influence factor is determined according to the photographed image in the manners below.

The first attenuation factor of the photographed image is determined according to the brightness of the central region in the photographed image and the brightness of the edge region in the photographed image. The second attenuation factor of the photographed image is determined according to the brightness of the center point in the photographed image and the brightness of the four corner positions in the photographed image. When the first attenuation factor of the photographed image is less than a pre-calibrated first attenuation factor of an image without fill light of the camera device, and the second attenuation factor of the photographed image is less than a pre-calibrated second attenuation factor of the image without fill light of the camera device, it is determined that the image illumination influence factor is the fill light. When the first attenuation factor of the photographed image is greater than or equal to the pre-calibrated first attenuation factor of the image without fill light of the camera device, or the second attenuation factor of the photographed image is greater than or equal to the pre-calibrated second attenuation factor of the image without fill light of the camera device, it is determined that the image illumination influence factor is the environmental illumination.

In the embodiments of the present disclosure, the center point described includes a set of one or more pixels at the center point position, and the four corner positions described include a set of one or more pixels at each corner position of the photographed image. In some example embodiments, the image is divided into m×n blocks. The center point includes one or more blocks at the center position. The four corner positions include one or more blocks at each corner position.

In some example embodiments, the first attenuation factor $D_{side}$ of the image is calculated in the following manner:

$$D_{side} = \frac{(2m+2n-4) \times \sum_{i=-1}^{1} \sum_{j=-1}^{1} Y_{((\frac{m}{2}+i),(\frac{n}{2}+j))}}{9 \times \left( \sum_{i=1}^{m}(Y_{i1}+Y_{in}) + \sum_{j=1}^{n}(Y_{1j}+Y_{mj}) \right)} \quad (2)$$

The second attenuation factor $D_{corner}$ of the image is calculated in the following manner:

$$D_{corner} = \frac{4 \times Y_{m/2, n/2}}{\sum_{i=1,m} \sum_{j=1,n} Y_{ij}} \quad (3)$$

The image is divided into m×n blocks. $Y_{ij}$ denotes the average brightness of the block at the i-th row and the j-th column. m and n are integers greater than 1. In some example embodiments, m and n are even numbers greater than 1. In some example embodiments, in the case where m is an odd number, m/2 is the largest integer less than m/2 or the smallest integer greater than m/2. In the case where n is an odd number, n/2 is the largest integer less than n/2 or the smallest integer greater than n/2.

In some example embodiments, the corresponding first attenuation factor and the corresponding second attenuation factor are calculated according to the image in the aspects below.

Figure 3:
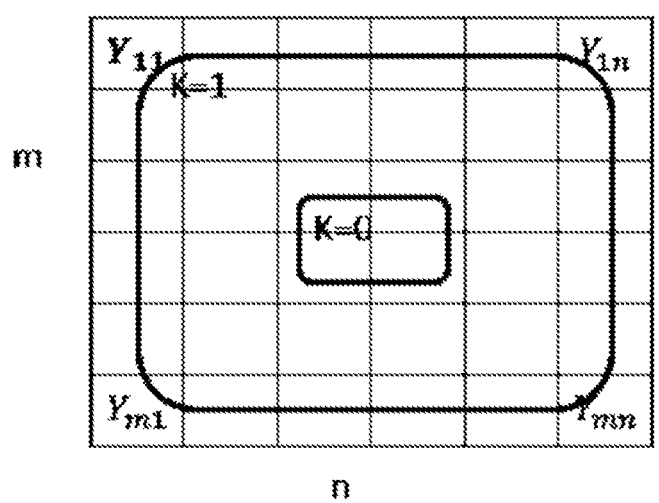
FIG. 3 is a diagram of image division according to an embodiment of the present disclosure.

As shown in FIG. 3, the image is divided into m×n blocks. m and n may be equal or different. After the average brightness $Y_{ij}$ of each block is separately calculated, the first attenuation factor $D_{side}$ and the second attenuation factor $D_{corner}$ are calculated according to the preceding formula (2) and the preceding formula (3) respectively. In FIG. 3, the region shown by K=0 is the central region, and the region shown by K=1 is the edge region. The unit of an attenuation factor is pixel/255. $D_{side}$ denotes the ratio between the brightness of the central region and the brightness of the edge region and indicates the uniformity of the brightness of the central region and the brightness of the edge region. $D_{corner}$ denotes the ratio between the brightness of the center point and the brightness of the four corner positions and indicates the uniformity of brightness of the center position and brightness of the four corner positions. The larger the attenuation factor is, the better the uniformity of the image is, that is, the better the uniformity is.

In the solutions provided by the embodiments of the present disclosure, the attenuation factor is strongly correlated with the image brightness. To improve a calibration speed and ensure the effect, in some example embodiments, only the brightness channel of the image is processed. Since the brightness of the YUV space is separated from the chroma, and the conversion between YUV and RGB is linear conversion, calibration is performed in the YUV space. The conversion between RGB and the YUV space is shown in the following formula (4):

$$\begin{cases} Y = 0.299R + 0.587G + 0.114B \\ U = 0.492(B-Y) \\ V = 0.877(R-Y) \end{cases} \quad (4)$$

Accordingly, in some example embodiments, in step 102, the first attenuation factor of the photographed image is determined, that is, the first attenuation factor $D_{side}$ of the photographed image is calculated according to the preceding formula (2). The second attenuation factor of the photographed image is determined, that is, the second attenuation factor $D_{corner}$ of the photographed image is calculated according to the preceding formula (3).

In step 102, in the process of determining the image illumination influence factor, a pre-calibrated first attenuation factor of the image without fill light of the camera device and a pre-calibrated second attenuation factor of the image without fill light of the camera device are used. In some example embodiments, these pre-calibration processes for the camera device are performed according to the steps 1 and 2 below, and the processes are also referred to as the acquisition process of a prior attenuation factor.

Step 1. Assuming that the intensity of the fill light is represented by L, the maximum intensity is Lmax, the minimum intensity is Lmin, and the fact that the light is not turned on is L0. During calibration, the distance between a photographing device (camera) and a white wall is represented by H. The device gain is represented by Gain. The device gain when the fill light is turned on normally is represented by $Gain_{loseless}$.

Step 2. The prior attenuation factor is acquired, and the table below is obtained through calibration in a laboratory.

TABLE 1

A prior attenuation factor table

| LED Intensity | $D_{side}$ | $D_{corner}$ | Image Illumination |
|---|---|---|---|
| L0 | $D0_{side}$ | $D0_{corner}$ | $E_{L0}$ |
| Lmax | $Dmax_{side}$ | $Dmax_{corner}$ | $E_{Lmax}$ |
| Lmin | $Dmin_{side}$ | $Dmin_{corner}$ | $E_{Lmin}$ |

In the Table 1, the data in the row where L0 is located corresponds to the first attenuation factor, the second attenuation factor, and the image illumination obtained by the camera device in the case where there is no fill light (the fill light is off) in an experimental environment. In the Table 1, the data in the row wherein Lmax is located corresponds to the first attenuation factor, the second attenuation factor, and the image illumination obtained by the camera device in the case where the intensity of the fill light is maximum in the experimental environment. In the Table 1, the data in the row where Lmin is located corresponds to the first attenuation factor, the second attenuation factor, and the image illumination obtained by the camera device in the case where the intensity of the fill light is minimum in the experimental environment.

Illustratively, parameters in the Table 1 are obtained according to the following method.

The camera device is placed at a position whose distance from the white wall is H. The environment brightness is adjusted to the device gain of $Gain_{loseless}$. The fill light is turned off. The current image illumination value $E_{L0}$ is read after exposure is stable. After the acquired image is converted into the YUV space, original attenuation values $D0_{side}$ and $D0_{corner}$ are acquired. That is, according to the image acquired by the camera device in this case, the preceding formula (2) and formula (3) are used to calculate the first attenuation factor $D0_{side}$ of the image without fill light of the camera device and the second attenuation factor $D0_{corner}$ of the image without fill light of the camera device.

Since light distribution curves of different fill lights are different, it is necessary to turn on the lights for calibration according to actual requirements. The intensity of the fill light is adjusted to the maximum Lmax. The current image illumination value $E_{Lmax}$ is read after exposure is stable. According to the image acquired by the camera device in this case, the preceding formula (2) and formula (3) are used to calculate the first attenuation factor $Dmax_{side}$ of the strongest fill light image of the camera device and the second attenuation factor $Dmax_{corner}$ of the strongest fill light image of the camera device. Then the intensity of the fill light is adjusted to the minimum intensity Lmin. The current environment brightness value $E_{Lmin}$ is read after exposure is stable. According to the image acquired by the camera device in this case, the preceding formula (2) and formula (3) are used to calculate the first attenuation factor $Dmin_{side}$ of the weakest fill light image of the camera device and the second attenuation factor $Dmin_{corner}$ of the weakest fill light image of the camera device. In this manner, parameters in the preceding Table 1 are recorded. The preceding prior attenuation factors can be used in subsequent steps.

In step 102, the image illumination influence factor is determined in the manners below.

When the first attenuation factor of the photographed image $D_{side}$ is less than the pre-calibrated first attenuation factor $D0_{side}$ of the image without fill light of the camera device, and the second attenuation factor $D_{corner}$ of the photographed image is less than the pre-calibrated second attenuation factor $D0_{corner}$ of the image without fill light of the camera device, it is determined that the image illumination influence factor is the fill light. It indicates that the image brightness uniformity represented by the first attenuation factor and the second attenuation factor calculated according to the current photographed image is relatively poor. Based on this, it is determined that the image illumination of the current photographed image is greatly affected by the fill light. Thus, it is determined that the image illumination influence factor is the fill light.

When the first attenuation factor $D_{side}$ of the photographed image is greater than or equal to the pre-calibrated first attenuation factor $D0_{side}$ of the image without fill light of the camera device, or the second attenuation factor $D_{corner}$ of the photographed image is greater than or equal to the pre-calibrated second attenuation factor $D0_{corner}$ of the image without fill light of the camera device, it is determined that the image illumination influence factor is the environmental illumination. It indicates that the image brightness uniformity represented by the first attenuation factor and the second attenuation factor calculated according to the current photographed image is relatively good. Based on this, it is determined that the image illumination of the current photographed image is less affected by the fill light. The image illumination is mainly affected by the environmental illumination. Thus, it is determined that the image illumination influence factor is the environmental illumination.

Referring to the pre-calibrated first attenuation factor $D0_{side}$ and second attenuation factor $D0_{corner}$ of the photographed image without fill light of the camera device, the step 102 is performed, so that whether the illumination of the image photographed by the current device is affected by the fill light or normal environmental illumination can be determined. That is, the corresponding image illumination influence factor is determined, and then the step 103 or 104 is performed according to different image illumination influence factors.

In the case where the image illumination influence factor is the environmental illumination, the step 103 is performed, so there is no need to dynamically adjust a black-to-color switching threshold. In the case where the image illumination influence factor is the fill light, the step 104 is performed, so the black-to-color switching threshold needs to be dynamically adjusted. Thus, the black-to-color switching threshold for controlling day-night switching is more reasonable to reduce repeated switching between day mode and night mode due to the influence of the fill light factor.

In some example embodiments, in step 104, the new black-to-color switching threshold is determined according to the photographing parameter of the camera device and the photographed image in the manners below.

A first black-to-color switching threshold factor is determined according to the first attenuation factor of the photographed image, the second attenuation factor of the photographed image, and a preset adjustment parameter. A second black-to-color switching threshold factor is determined according to the brightness of the fill light and the device gain in the photographing parameter. The new black-to-color switching threshold is determined according to the first black-to-color switching threshold factor, the second black-to-color switching threshold factor, and the current black-to-color switching threshold.

In some example embodiments, the first black-to-color switching threshold factor $\varphi(D_{side}, D_{corner})$ is determined according to the following formula:

$$\varphi(D_{side}, D_{corner}) = \frac{1}{\left(\alpha\left(\frac{D_{side}}{|Dmax_{side} - Dmin_{side}|}\right) + (1-\alpha)\left(\frac{D_{corner}}{|Dmax_{corner} - Dmin_{corner}|}\right)\right)} \quad (5)$$

$D_{side}$ denotes the first attenuation factor of the photographed image. $D_{corner}$ denotes the second attenuation factor of the photographed image. $\alpha$ denotes the preset adjustment parameter, where $0 \leq \alpha \leq 1$. $Dmax_{side}$ denotes a pre-calibrated first attenuation factor of the strongest fill light image of the camera device. $Dmin_{side}$ denotes a pre-calibrated first attenuation factor of the weakest fill light image of the camera device. $Dmax_{corner}$ denotes a pre-calibrated second attenuation factor of the strongest fill light image of the camera device. $Dmin_{corner}$ denotes a pre-calibrated second attenuation factor of the weakest fill light image of the camera device.

Here, $Dmax_{side}$, $Dmin_{side}$, $Dmax_{corner}$, and $Dmin_{corner}$ denote the relevant first attenuation factor and second attenuation factor obtained during the pre-calibration process. The formula (5) is used to determine the first blackto-color switching threshold factor according to the first attenuation factor $D_{side}$, the second attenuation factor $D_{corner}$, and the preset adjustment parameter α of the current image. The adjustment parameter α is used to adjust the weight of the first attenuation factor $D_{side}$ and the second attenuation factor $D_{corner}$ for calculating the first black-to-color switching threshold factor. The larger the adjustment parameter α is, the higher the weight of the first attenuation factor $D_{side}$ is. The smaller the adjustment parameter α is, the higher the weight of the second attenuation factor $D_{corner}$ is. The adjustment parameter α is determined according to the characteristics of the image photographed by the photographing device to reduce the influence of the first black-to-color switching threshold factor by the photographing characteristics of the photographing device.

For example, if the image photographed by the camera device has vignetting, the adjustment parameter α is enlarged, the weight of the first attenuation factor $D_{side}$ is increased, and the weight of the second attenuation factor $D_{corner}$ is decreased, so that, the first black-to-color switching threshold factor is more affected by the first attenuation factor $D_{side}$. For another example, if the flatness of the image photographed by the photographing device is poor, for example, the upper and lower sides or the right and left sides are inconsistent in proportion (for example, the top is narrow and the bottom is wide, and the left is narrow and the right is wide), the adjustment parameter α is reduced, the weight of the first attenuation factor $D_{side}$ is decreased, and the weight of the second attenuation factor $D_{corner}$ is increased, so that, the first black-to-color switching threshold factor is more affected by the second attenuation factor. Accordingly, the adjustment parameter α may be adjusted correspondingly according to the photographing characteristics of the camera device to reduce the influence of the photographing device.

The second black-to-color switching threshold factor F(L, Gain) is determined according to the following attenuation function obtained by pre-fitting:

$$F(L, \text{Gain}) = \frac{A1 \times (\text{Gain}^2) + A0}{B1 \times \log_B\left(\frac{L}{10} + 1\right)} \quad (6)$$

L denotes the brightness of the fill light. Gain denotes the device gain. A1, A0, B1, and B are constants obtained by pre-fitting, where A1<0, B>1, B1>0, and A0>0. The new black-to-color switching threshold is determined according to the following formula:

$$T_{n2d\text{-}new} = \varphi(D_{side}, D_{corner}) \times F(L, \text{Gain}) \times T_{n2d} \quad (7)$$

$T_{n2d}$ denotes the current black-to-color switching threshold. $T_{n2d}$-new denotes the new black-to-color switching threshold.

In some example embodiments, in addition to the preceding steps 1 and 2, the pre-calibration process for the camera device also includes the step 3 below.

Step 3. It can be inferred that the black-to-color switching threshold is affected by the device gain and the intensity of the fill light according to experience. Assuming that the maximum gain of the device is Gainmax, in the case where other factors remain unchanged, as the device gain increases, the black-to-color switching threshold decreases; and in the case where other factors remain unchanged, since the intensity change of the fill light is nonlinear, the black-to-color switching threshold roughly shows a logarithmic increasing trend according to the intensity response of the fill light. Moreover, when the environment is relatively bright, the light of the fill light has less impact on the black-to-color switching threshold. Thus, an attenuation function related to the device gain and the intensity of the fill light is constructed to determine the second black-to-color switching threshold factor as follows:

$$F(L, \text{Gain}) = \frac{A1 \times (\text{Gain}^2) + A0}{B1 \times \log_B\left(\frac{L}{10} + 1\right)} \quad (6)$$

A1, A0, B1, and B are parameters fitted according to the actual situation of the camera device and the fill light. A1, A0, B1, and B are constants and satisfy A1<0, B>1, B1>0, and A0>0. Those skilled in the art may implement fitting steps by using corresponding fitting methods according to sample data, which does not fall within the scope of protection or limitation of the embodiments of the present disclosure.

After the first black-to-color switching threshold factor and the second black-to-color switching threshold factor are calculated according to the formula (5) and the formula (6), and the new black-to-color switching threshold is determined according to the formula (7). The new black-to-color switching threshold is determined according to the first attenuation factor, the second attenuation factor, the brightness of the current fill light, and the device gain of the current photographed image. This dynamically determined black-to-color switching threshold can effectively reduce repeatedly switching between day mode and night mode in day-night switching control, and ensure that the mode of the camera device is not switched back to the night mode again due to the fact that the fill light is turned off after the mode of the camera device switching from the night mode to the day mode due to the factor of the fill light. In this manner, the accuracy of the black-to-color switching threshold in the day-night switching scheme is improved, and the stability of the day-night switching function is ensured.

Figure 4:
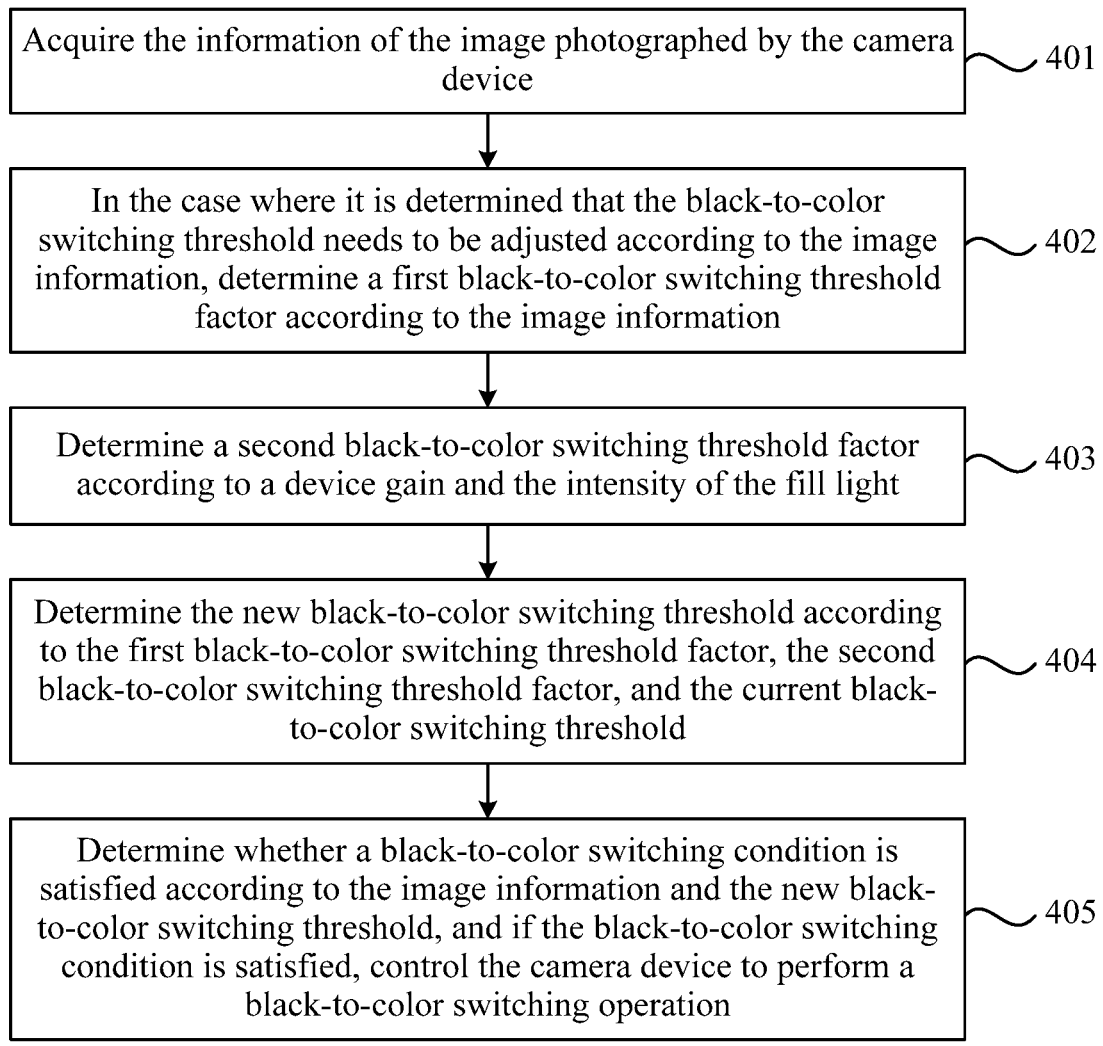
FIG. 4 is a flowchart of another day-night switching method according to an embodiment of the present disclosure.

The embodiments of the present disclosure also provide a day-night switching method. As shown in FIG. 4, the method includes the steps below.

In step 401, the information of the image photographed by the camera device is acquired.

In step 402, in the case where it is determined that the black-to-color switching threshold needs to be adjusted according to the image information, the first black-to-color switching threshold factor is determined according to the image information.

In step 403, the second black-to-color switching threshold factor is determined according to the device gain and the intensity of the fill light.

In step 404, the new black-to-color switching threshold is determined according to the first black-to-color switching threshold factor, the second black-to-color switching threshold factor, and the current black-to-color switching threshold.

In step 405, whether a black-to-color switching condition is satisfied is determined according to the image information and the new black-to-color switching threshold. If the blackto-color switching condition is satisfied, the camera device is controlled to perform a black-to-color switching operation.

In some example embodiments, before the step 401, the method also includes the step 400 below.

In step 400, the pre-calibrated data of the camera device is acquired.

In some example embodiments, the pre-calibrated data includes the initial value of the black-to-color switching threshold.

In some example embodiments, the pre-calibrated data also includes a first attenuation factor $D0_{side}$ of the image without fill light of the camera device, a second attenuation factor $D0_{corner}$ of the image without fill light of the camera device, a first attenuation factor $Dmax_{side}$ of the strongest fill light image of the camera device, a second attenuation factor $Dmax_{corner}$ of the strongest fill light image of the camera device, a first attenuation factor $Dmin_{side}$ of the weakest fill light image of the camera device, and a second attenuation factor $Dmin_{corner}$ of the weakest fill light image of the camera device.

In some example embodiments, the pre-calibrated data also includes a pre-fitted attenuation function, that is, constants obtained by pre-fitting in the attenuation function:

$$F(L, \text{Gain}) = \frac{A1 \times (\text{Gain}^2) + A0}{B1 \times \log_B\left(\frac{L}{10} + 1\right)} \quad (6)$$

The calculation method of the preceding pre-calibrated data may adopt the method exemplified in the preceding embodiments, and the details are not repeated here.

In some example embodiments, the image information includes the image illumination and the image illumination influence factor.

The image illumination influence factor includes the fill light or the environmental illumination.

In some example embodiments, the image illumination influence factor is determined according to the first attenuation factor $D_{side}$ of the image photographed by the camera device, the second attenuation factor $D_{corner}$ of the image photographed by the camera device, and $D0_{side}$ and $D0_{side}$ in the pre-calibrated data.

In some example embodiments, in step 402, it is determined that the black-to-color switching threshold is adjusted according to the image information in the manners below.

In the case where the image illumination is greater than the current black-to-color switching threshold, the image illumination influence factor in the image information is the fill light, and it is determined that the black-to-color switching threshold needs to be adjusted. In the case where the image illumination is not greater than the current black-to-color switching threshold, it is determined that the black-to-color switching threshold does not need to be adjusted, and the day-night switching control of the camera device is performed according to the current new black-to-color switching threshold.

In some example embodiments, in step 402, the first black-to-color switching threshold factor is determined according to the image information in the manners below.

According to the first attenuation factor $D_{side}$ of the image photographed by the camera device, the second attenuation factor $D_{corner}$ of the image photographed by the camera device, and $Dmax_{side}$, $Dmin_{side}$, $Dmax_{corner}$, and $Dmin_{corner}$ in the pre-calibrated data, the first black-to-color switching threshold factor $\varphi(D_{side}, D_{corner})$ is determined according to the formula (5).

In some example embodiments, in step 403, the second black-to-color switching threshold factor $F(L, \text{Gain})$ is determined according to the formula (6).

In some example embodiments, in step 404, the new black-to-color switching threshold is determined according to the formula (7).

Figure 5:
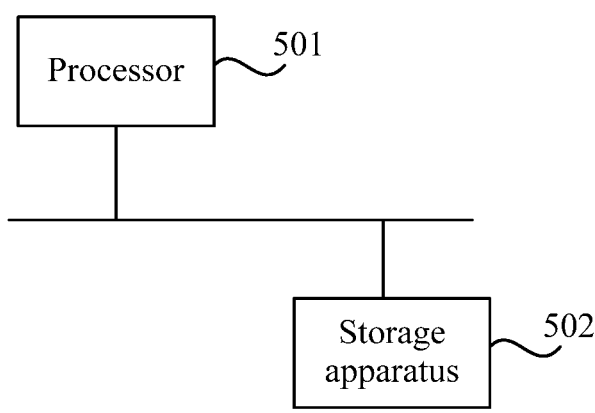
FIG. 5 is a block diagram illustrating the structure of an electronic device according to an embodiment of the present disclosure.

The embodiments of the present disclosure also provide an electronic device. As shown in FIG. 5, the electronic device includes one or more processors 501 (only one processor 501 is shown in FIG. 5 as an example) and a storage apparatus 502 configured to store one or more programs. When executing the one or more programs, the one or more processors perform the day-night switching method as described in any of the preceding embodiments.

The embodiments of the present disclosure also provide a computer-readable storage medium. The storage medium stores a computer program. When executing the program, a processor performs the day-night switching method as described in any of the preceding embodiments.

In the day-night switching method provided by the embodiments of the present disclosure, the first attenuation factor and the second attenuation factor are calculated according to the photographed image. Then, whether the image illumination of the current photographed image is more affected by the environment or the fill light is determined, and different black-to-color switching thresholds are determined. In this manner, day-night determination can be performed more accurately, and all photographing systems having fill lights are applicable.

In the solutions provided by the embodiments of the present disclosure, in consideration of the uniformity of the brightness of the central region and the brightness of the edge region in the photographed image, as well as the uniformity of the brightness of the center point and the brightness of the four corner positions in the photographed image, the first attenuation factor and the second attenuation factor are introduced. In addition, the influence of the intensity of the fill light and the device gain is considered to dynamically adjust the black-to-color switching threshold. In this manner, the environmental adaptability of the black-to-color switching threshold is improved, thereby improving the accuracy of day-night switching determination.

All or part of the steps of the method, and functional modules/units in the system and apparatus disclosed above are implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application-specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital video disc (DVD) or other optical disc storage, a magnetic cassette, a magnetic tape, disk storage or other magnetic storage apparatus, or any other medium used to store the desired information and accessible by a computer. In addition, as is known to those skilled in the art, the communication media generally include computer-readable instructions, data structures, program modules or other data in modulated data signals such as carriers or other transmission mechanisms, and may include any information delivery media.

What is claimed is:

1. A day-night switching method, comprising:
   determining image illumination according to a photographed image acquired by a camera device;
   in response to the image illumination being greater than a current black-to-color switching threshold, determining an image illumination influence factor according to the photographed image;
   in response to the image illumination influence factor being environmental illumination, controlling the camera device to perform day-night switching according to the image illumination and the current black-to-color switching threshold; and
   in response to the image illumination influence factor being a fill light, determining a new black-to-color switching threshold according to a photographing parameter of the camera device and the photographed image, and controlling the camera device to perform day-night switching according to the image illumination and the new black-to-color switching threshold.

2. The method according to claim 1, before determining the image illumination influence factor according to the photographed image, further comprising:
   determining whether the image illumination changes; and
   in response to the image illumination not changing, controlling the camera device to perform the day-night switching according to the image illumination and the current black-to-color switching threshold,
   wherein determining the image illumination influence factor according to the photographed image comprises:
   in response to the image illumination changing, determining the image illumination influence factor according to the photographed image;
   wherein determining whether the image illumination changes comprises:
   calculating a change amplitude of the image illumination compared with historical image illumination acquired last time and determining whether the change amplitude is greater than or equal to a first change amplitude threshold;
   in response to the image illumination not changing comprises:
   in response to the change amplitude being less than the first change amplitude threshold; and
   in response to the image illumination changing comprises:
   in response to the change amplitude being greater than or equal to the first change amplitude threshold;
   or
   wherein determining whether the image illumination changes comprises:
   calculating a change amplitude of the image illumination compared with an average value of historical image illumination acquired for previous N times and determining whether the change amplitude is greater than or equal to a second change amplitude threshold; and
   in response to the image illumination not changing comprises:
   in response to the change amplitude being less than the second change amplitude threshold; and
   in response to the image illumination changing comprises:
   in response to the change amplitude being greater than or equal to the second change amplitude threshold.

3. The method according to claim 1, wherein the method further comprising: predetermining an initial value of a black-to-color switching threshold according to the following manners:
   in a dark room scenario, in a case where the camera device is configured to be in a night mode, and the fill light is turned on, environment brightness is increased; and in a case where image quality of an image acquired by the camera device satisfies a preset image quality requirement after removing a fill light factor, acquiring a current environmental illumination value as the initial value of the black-to-color switching threshold.

4. The method according to claim 1, wherein determining the image illumination influence factor according to the photographed image comprises:
   determining a first attenuation factor used for indicating uniformity of brightness of a central region in the photographed image and brightness of an edge region in the photographed image according to the photographed image;
   determining a second attenuation factor used for indicating uniformity of brightness of a center point in the photographed image and brightness of four corner positions in the photographed image according to the photographed image; and
   determining the image illumination influence factor according to the first attenuation factor and the second attenuation factor.

5. The method according to claim 1, wherein determining the image illumination influence factor according to the photographed image comprises:
   determining a first attenuation factor of the photographed image according to brightness of a central region in the photographed image and brightness of an edge region in the photographed image;
   determining a second attenuation factor of the photographed image according to brightness of a center point in the photographed image and brightness of four corner positions in the photographed image;
   in a case where the first attenuation factor of the photographed image is less than a pre-calibrated first attenuation factor of an image without fill light of the camera device, and the second attenuation factor of the photographed image is less than a pre-calibrated second attenuation factor of the image without the fill light of the camera device, determining that the image illumination influence factor is the fill light; and
   in a case where the first attenuation factor of the photographed image is greater than or equal to the pre-calibrated first attenuation factor of the image without the fill light of the camera device, or the second attenuation factor of the photographed image is greater than or equal to the pre-calibrated second attenuation factor of the image without the fill light of the camera device, determining that the image illumination influence factor is the environmental illumination.

6. The method according to claim 5, wherein the first attenuation factor $D_{side}$ of the photographed image is calculated in the following manner:

$$D_{side} = \frac{(2m+2n-4) \times \sum_{i=-1}^{1} \sum_{j=-1}^{1} Y_{((\frac{m}{2}+i),(\frac{n}{2}+j))}}{9 \times \left(\sum_{i=1}^{m}(Y_{i1}+Y_{in}) + \sum_{j=1}^{n}(Y_{1j}+Y_{mj})\right)};$$

and
the second attenuation factor $D_{corner}$ of the photographed image is calculated in the following manner:

$$D_{corner} = \frac{4 \times Y_{m/2,n/2}}{\sum_{i=1,m} \sum_{j=1,n} Y_{ij}},$$

wherein the photographed image is divided into m×n blocks, $Y_{ij}$ denotes average brightness of a block at an i-th row and a j-th column, and m and n are integers greater than 1.

7. The method according to claim 5, wherein determining the new black-to-color switching threshold according to the photographing parameter of the camera device and the photographed image comprises:
determining a first black-to-color switching threshold factor according to the first attenuation factor of the photographed image, the second attenuation factor of the photographed image, and a preset adjustment parameter;
determining a second black-to-color switching threshold factor according to brightness of the fill light and a device gain in the photographing parameter; and
determining the new black-to-color switching threshold according to the first black-to-color switching threshold factor, the second black-to-color switching threshold factor, and the current black-to-color switching threshold.

8. The method according to claim 7, wherein
the first black-to-color switching threshold factor $\varphi(D_{side}, D_{corner})$ is determined according to the following formula:

$$\varphi(D_{side}, D_{corner}) = \frac{1}{\left(\alpha\left(\frac{D_{side}}{|D\max_{side}-D\min_{side}|}\right) + (1-\alpha)\left(\frac{D_{corner}}{|D\max_{corner}-D\min_{corner}|}\right)\right)},$$

wherein $D_{side}$ denotes the first attenuation factor of the photographed image, $D_{corner}$ denotes the second attenuation factor of the photographed image, and α denotes the preset adjustment parameter, wherein 0≤α≤1;
$D\max_{side}$ denotes a pre-calibrated first attenuation factor of a strongest fill light image of the camera device, and $D\min_{side}$ denotes a pre-calibrated first attenuation factor of a weakest fill light image of the camera device;
$D\max_{corner}$ denotes a pre-calibrated second attenuation factor of a strongest fill light image of the camera device, and $D\min_{corner}$ denotes a pre-calibrated second attenuation factor of a weakest fill light image of the camera device; and
the second black-to-color switching threshold factor F(L, Gain) is determined according to the following attenuation function obtained by pre-fitting:

$$F(L, \text{Gain}) = \frac{A1 \times (\text{Gain}^2) + A0}{B1 \times \log_B\left(\frac{L}{10}+1\right)},$$

wherein L denotes the brightness of the fill light, Gain denotes the device gain, and A1, A0, B1, and B are constants obtained by pre-fitting, wherein A1<0, B>1, B1>0, and A0>0; and
the new black-to-color switching threshold is determined according to the following formula:

$$T_{n2d-new} = \varphi(D_{side}, D_{corner}) \times F(L, \text{Gain}) \times T_{n2d},$$

wherein $T_{n2d}$ denotes the current black-to-color switching threshold, and $T_{n2d-new}$ denotes the new black-to-color switching threshold.

9. An electronic device, comprising:
at least one processor; and
a storage apparatus configured to store at least one program;
wherein when executing the at least one program, the at least one processor is instructed to perform a day-night switching method;
wherein the method comprising:
determining image illumination according to a photographed image acquired by a camera device;
in response to the image illumination being greater than a current black-to-color switching threshold, determining an image illumination influence factor according to the photographed image;
in response to the image illumination influence factor being environmental illumination, controlling the camera device to perform day-night switching according to the image illumination and the current black-to-color switching threshold; and
in response to the image illumination influence factor being a fill light, determining a new black-to-color switching threshold according to a photographing parameter of the camera device and the photographed image, and controlling the camera device to perform day-night switching according to the image illumination and the new black-to-color switching threshold.

10. The electronic device according to claim 9, wherein before determining the image illumination influence factor according to the photographed image, the method further comprising:
determining whether the image illumination changes; and
in response to the image illumination not changing, controlling the camera device to perform the day-night switching according to the image illumination and the current black-to-color switching threshold,
wherein determining the image illumination influence factor according to the photographed image comprises:
in response to the image illumination changing, determining the image illumination influence factor according to the photographed image;
wherein determining whether the image illumination changes comprises:
calculating a change amplitude of the image illumination compared with historical image illumination acquired last time and determining whether the change amplitude is greater than or equal to a first change amplitude threshold;

in response to the image illumination not changing comprises:
in response to the change amplitude being less than the first change amplitude threshold; and
in response to the image illumination changing comprises:
in response to the change amplitude being greater than or equal to the first change amplitude threshold;
or
wherein determining whether the image illumination changes comprises:
calculating a change amplitude of the image illumination compared with an average value of historical image illumination acquired for previous N times and determining whether the change amplitude is greater than or equal to a second change amplitude threshold; and
in response to the image illumination not changing comprises:
in response to the change amplitude being less than the second change amplitude threshold; and
in response to the image illumination changing comprises:
in response to the change amplitude being greater than or equal to the second change amplitude threshold.

11. The electronic device according to claim 9, wherein the method further comprising: predetermining an initial value of a black-to-color switching threshold according to the following manners:
in a dark room scenario, in a case where the camera device is configured to be in a night mode, and the fill light is turned on, environment brightness is increased; and in a case where image quality of an image acquired by the camera device satisfies a preset image quality requirement after removing a fill light factor, acquiring a current environmental illumination value as the initial value of the black-to-color switching threshold.

12. The electronic device according to claim 9, wherein determining the image illumination influence factor according to the photographed image comprises:
determining a first attenuation factor used for indicating uniformity of brightness of a central region in the photographed image and brightness of an edge region in the photographed image according to the photographed image;
determining a second attenuation factor used for indicating uniformity of brightness of a center point in the photographed image and brightness of four corner positions in the photographed image according to the photographed image; and
determining the image illumination influence factor according to the first attenuation factor and the second attenuation factor.

13. The electronic device according to claim 9, wherein determining the image illumination influence factor according to the photographed image comprises:
determining a first attenuation factor of the photographed image according to brightness of a central region in the photographed image and brightness of an edge region in the photographed image;
determining a second attenuation factor of the photographed image according to brightness of a center point in the photographed image and brightness of four corner positions in the photographed image;
in a case where the first attenuation factor of the photographed image is less than a pre-calibrated first attenuation factor of an image without fill light of the camera device, and the second attenuation factor of the photographed image is less than a pre-calibrated second attenuation factor of the image without the fill light of the camera device, determining that the image illumination influence factor is the fill light; and
in a case where the first attenuation factor of the photographed image is greater than or equal to the pre-calibrated first attenuation factor of the image without the fill light of the camera device, or the second attenuation factor of the photographed image is greater than or equal to the pre-calibrated second attenuation factor of the image without the fill light of the camera device, determining that the image illumination influence factor is the environmental illumination.

14. The electronic device according to claim 13, wherein the first attenuation factor $D_{side}$ of the photographed image is calculated in the following manner:

$$D_{side} = \frac{(2m+2n-4) \times \sum_{i=-1}^{1} \sum_{j=-1}^{1} Y_{((\frac{m}{2}+i),(\frac{n}{2}+j))}}{9 \times \left(\sum_{i=1}^{m}(Y_{i1}+Y_{in}) + \sum_{j=1}^{n}(Y_{1j}+Y_{mj})\right)};$$

and
the second attenuation factor $D_{corner}$ of the photographed image is calculated in the following manner:

$$D_{corner} = \frac{4 \times Y_{m/2, n/2}}{\sum_{i=1,m} \sum_{j=1,n} Y_{ij}},$$

wherein the photographed image is divided into m×n blocks, $Y_{ij}$ denotes average brightness of a block at an i-th row and a j-th column, and m and n are integers greater than 1.

15. The electronic device according to claim 13, wherein determining the new black-to-color switching threshold according to the photographing parameter of the camera device and the photographed image comprises:
determining a first black-to-color switching threshold factor according to the first attenuation factor of the photographed image, the second attenuation factor of the photographed image, and a preset adjustment parameter;
determining a second black-to-color switching threshold factor according to brightness of the fill light and a device gain in the photographing parameter; and
determining the new black-to-color switching threshold according to the first black-to-color switching threshold factor, the second black-to-color switching threshold factor, and the current black-to-color switching threshold.

16. The electronic device according to claim 15, wherein the first black-to-color switching threshold factor $\varphi(D_{side}, D_{corner})$ is determined according to the following formula:

$$\varphi(D_{side}, D_{corner}) = \frac{1}{\left(\alpha\left(\frac{D_{side}}{|D\max_{side}-D\min_{side}|}\right) + (1-\alpha)\left(\frac{D_{corner}}{|D\max_{corner}-D\min_{corner}|}\right)\right)},$$

wherein $D_{side}$ denotes the first attenuation factor of the photographed image, $D_{corner}$ denotes the second attenuation factor of the photographed image, and $\alpha$ denotes the preset adjustment parameter, wherein $0 \le \alpha \le 1$;

Dmax$_{side}$ denotes a pre-calibrated first attenuation factor of a strongest fill light image of the camera device, and Dmin$_{side}$ denotes a pre-calibrated first attenuation factor of a weakest fill light image of the camera device;

Dmax$_{corner}$ denotes a pre-calibrated second attenuation factor of a strongest fill light image of the camera device, and Dmin$_{corner}$ denotes a pre-calibrated second attenuation factor of a weakest fill light image of the camera device; and the second black-to-color switching threshold factor F(L, Gain) is determined according to the following attenuation function obtained by pre-fitting:

$$F(L, \text{Gain}) = \frac{A1 \times (\text{Gain}^2) + A0}{B1 \times \log_B\left(\frac{L}{10} + 1\right)},$$

wherein L denotes the brightness of the fill light, Gain denotes the device gain, and A1, A0, B1, and B are constants obtained by pre-fitting, wherein A1<0, B>1, B1>0, and A0>0; and the new black-to-color switching threshold is determined according to the following formula:

$$T_{n2d-new} = \varphi(D_{side}, D_{corner}) \times F(L, \text{Gain}) \times T_{n2d},$$

wherein T$_{n2d}$ denotes the current black-to-color switching threshold, and T$_{n2d-new}$ denotes the new black-to-color switching threshold.

17. A non-transitory computer-readable storage medium, storing a computer program, wherein when executing the program, a processor is instructed to perform a day-night switching method;

wherein the method comprising:
determining image illumination according to a photographed image acquired by a camera device;
in response to the image illumination being greater than a current black-to-color switching threshold, determining an image illumination influence factor according to the photographed image;
in response to the image illumination influence factor being environmental illumination, controlling the camera device to perform day-night switching according to the image illumination and the current black-to-color switching threshold; and
in response to the image illumination influence factor being a fill light, determining a new black-to-color switching threshold according to a photographing parameter of the camera device and the photographed image, and controlling the camera device to perform day-night switching according to the image illumination and the new black-to-color switching threshold.

18. The non-transitory computer-readable storage medium according to claim 17, before determining the image illumination influence factor according to the photographed image, further comprising:
determining whether the image illumination changes; and
in response to the image illumination not changing, controlling the camera device to perform the day-night switching according to the image illumination and the current black-to-color switching threshold, wherein determining the image illumination influence factor according to the photographed image comprises:
in response to the image illumination changing, determining the image illumination influence factor according to the photographed image;
wherein determining whether the image illumination changes comprises:
calculating a change amplitude of the image illumination compared with historical image illumination acquired last time and determining whether the change amplitude is greater than or equal to a first change amplitude threshold;
in response to the image illumination not changing comprises:
in response to the change amplitude being less than the first change amplitude threshold; and
in response to the image illumination changing comprises:
in response to the change amplitude being greater than or equal to the first change amplitude threshold;
or
wherein determining whether the image illumination changes comprises:
calculating a change amplitude of the image illumination compared with an average value of historical image illumination acquired for previous N times and determining whether the change amplitude is greater than or equal to a second change amplitude threshold; and
in response to the image illumination not changing comprises:
in response to the change amplitude being less than the second change amplitude threshold; and
in response to the image illumination changing comprises:
in response to the change amplitude being greater than or equal to the second change amplitude threshold.

19. The non-transitory computer-readable storage medium according to claim 17, wherein the method further comprising: predetermining an initial value of a black-to-color switching threshold according to the following manners:
in a dark room scenario, in a case where the camera device is configured to be in a night mode, and the fill light is turned on, environment brightness is increased; and in a case where image quality of an image acquired by the camera device satisfies a preset image quality requirement after removing a fill light factor, acquiring a current environmental illumination value as the initial value of the black-to-color switching threshold.

20. The non-transitory computer-readable storage medium according to claim 17, wherein determining the image illumination influence factor according to the photographed image comprises:
determining a first attenuation factor used for indicating uniformity of brightness of a central region in the photographed image and brightness of an edge region in the photographed image according to the photographed image;
determining a second attenuation factor used for indicating uniformity of brightness of a center point in the photographed image and brightness of four corner positions in the photographed image according to the photographed image; and
determining the image illumination influence factor according to the first attenuation factor and the second attenuation factor.

* * * * *